US00RE48170E

(19) United States
(12) Reissued Patent
Lee

(10) Patent Number: US RE48,170 E
(45) Date of Reissued Patent: Aug. 25, 2020

(54) HAIR STYLING APPARATUSES AND RELATED METHODS

(71) Applicant: Kiss Nail Products, Inc., Port Washington, NY (US)

(72) Inventor: Kyong Hak Lee, Plainview, NY (US)

(73) Assignee: Kiss Nail Products, Inc., Port Washington, NY (US)

(21) Appl. No.: 16/111,970

(22) Filed: Aug. 24, 2018

Related U.S. Patent Documents

Reissue of:
(64) Patent No.: 10,010,147
Issued: Jul. 3, 2018
Appl. No.: 15/076,065
Filed: Mar. 21, 2016

U.S. Applications:
(63) Continuation-in-part of application No. 14/980,280, filed on Dec. 28, 2015, now Pat. No. 10,117,488.

(30) Foreign Application Priority Data

Jan. 15, 2015 (KR) ..... 10-2015-0007396

(51) Int. Cl.
*A45D 6/00* (2006.01)
*A45D 1/18* (2006.01)
(Continued)

(52) U.S. Cl.
CPC ..... *A45D 1/04* (2013.01); *A45D 1/18* (2013.01); *A45D 1/28* (2013.01); *A45D 7/02* (2013.01);
(Continued)

(58) Field of Classification Search
CPC ..... A45D 1/04; A45D 2/00; A45D 2002/006; A45D 2002/007; A45D 7/02
(Continued)

(56) References Cited

U.S. PATENT DOCUMENTS 1,429,167 A 9/1922 Scharer
1,623,758 A 4/1927 Santurello
(Continued)

FOREIGN PATENT DOCUMENTS

CN 101896091 A 11/2010
CN 201958032 9/2011
CN 201958032 U 9/2011
CN 102711549 10/2012
CN 102711549 A 10/2012
CN 102783803 11/2012
CN 102783803 A 11/2012
(Continued)

OTHER PUBLICATIONS

Cortex 4-in-1 Ceramic Clipless Curling Iron Set, Folica, http://www.folica.com/tools/curling-irons/cortex-professional-4-in-1-cermanic-clipless-curling-iron-se:#tab=overview, (Screenshot taken on Nov. 25, 2013).
(Continued)

*Primary Examiner* — Cary E Wehner
(74) *Attorney, Agent, or Firm* — Cherskov Flaynik & Gurda, LLC

(57) ABSTRACT

The present disclosure relates to hair styling apparatuses and related methods. The hair styling apparatus includes a heated barrel defining a hair styling surface and a central axis, and a rotating member disposed at an end of the hair styling surface. The rotating member is configured to rotate around the central axis of the heated barrel. The rotating member includes one or more retaining elements configured to retain the hair and wind the hair around the hair styling surface. The one or more retaining elements projects away from the hair styling surface.

19 Claims, 15 Drawing Sheets

(51) Int. Cl.

| | |
|---|---|
| ***A45D 1/12*** | (2006.01) |
| ***A45D 1/04*** | (2006.01) |
| ***A45D 1/28*** | (2006.01) |
| ***A45D 7/02*** | (2006.01) |
| *A45D 1/00* | (2006.01) |

(52) U.S. Cl.
CPC ..... *A45D 1/12* (2013.01); *A45D 2001/002* (2013.01); *A45D 2001/004* (2013.01)

(58) Field of Classification Search
USPC ..... 132/266
See application file for complete search history.

(56) References Cited

U.S. PATENT DOCUMENTS

| | | | | | |
|---|---|---|---|---|---|
| 1,652,279 | A | * | 12/1927 | Jacobs | A45D 6/02 132/266 |
| 1,661,747 | A | | 3/1928 | Capdevila | |
| 1,662,411 | A | | 3/1928 | Bonat et al. | |
| 1,763,655 | A | | 6/1930 | Ingrassia | |
| RE17,832 | E | * | 10/1930 | Borden | A45D 2/06 132/266 |
| 1,815,266 | A | | 7/1931 | Bonat et al. | |
| 1,824,497 | A | * | 9/1931 | Percell | A45D 2/04 132/266 |
| 1,901,430 | A | | 3/1933 | Bjorkman | |
| 2,424,815 | A | * | 7/1947 | Grant | A45D 2/02 132/266 |
| 2,454,558 | A | | 11/1948 | Kleinsmith | |
| 2,527,218 | A | | 10/1950 | Heaton | |
| 2,788,006 | A | | 4/1957 | Trabish | |
| 3,057,363 | A | | 10/1963 | Talbot | |
| 3,105,503 | A | | 10/1963 | Safianoff | |
| 3,859,497 | A | | 1/1975 | McNair | |
| 3,890,984 | A | | 6/1975 | Lesetar | |
| 3,918,465 | A | | 11/1975 | Barradas | |
| 4,023,578 | A | | 5/1977 | Buhler | |
| 4,024,375 | A | | 5/1977 | Olesen et al. | |
| 4,177,824 | A | * | 12/1979 | Gnaga | A45D 6/06 132/238 |
| 4,233,999 | A | | 11/1980 | Thomas | |
| 4,267,431 | A | | 5/1981 | Rick et al. | |
| 4,267,851 | A | | 5/1981 | Plaisted | |
| 4,314,137 | A | | 2/1982 | Dorn | |
| 4,329,567 | A | | 5/1982 | Kunz et al. | |
| 4,419,565 | A | | 12/1983 | McGaw | |
| 4,443,688 | A | | 4/1984 | Andis | |
| 4,456,815 | A | | 6/1984 | Andis | |
| 4,468,554 | A | | 8/1984 | Andis | |
| 4,469,934 | A | * | 9/1984 | Isshiki | A45D 1/04 132/118 |
| 4,473,086 | A | | 9/1984 | Thaler et al. | |
| 4,593,708 | A | | 6/1986 | Goeller et al. | |
| 4,641,010 | A | | 2/1987 | Abura et al. | |
| 4,664,132 | A | | 5/1987 | Schillig | |
| 4,829,156 | A | * | 5/1989 | Thompson | A45D 1/04 132/232 |
| 4,866,248 | A | | 9/1989 | Altamore | |
| 4,953,574 | A | * | 9/1990 | Tsuji | H05B 3/16 132/232 |
| 5,046,516 | A | | 9/1991 | Barradas | |
| 5,091,630 | A | | 2/1992 | Djuric | |
| 5,186,188 | A | | 2/1993 | Fasolt | |
| 5,191,907 | A | | 3/1993 | Hirzel | |
| 5,365,037 | A | | 11/1994 | Chan | |
| 5,400,810 | A | | 3/1995 | Taylor | |
| 5,513,665 | A | | 5/1996 | Chan | |
| 5,558,107 | A | | 9/1996 | Kim | |
| 5,765,575 | A | | 6/1998 | Denebeim | |
| 6,554,000 | B2 | | 4/2003 | Lin et al. | |
| 6,627,852 | B1 | | 9/2003 | Savone | |
| 7,271,368 | B2 | | 9/2007 | Yeung | |
| 8,132,571 | B1 | | 3/2012 | Jackson | |
| 8,539,964 | B2 | | 9/2013 | Rong | |
| 8,646,465 | B2 | | 2/2014 | Tam et al. | |
| 9,185,957 | B2 | | 11/2015 | Richmond et al. | |
| 2003/0052115 | A1 | | 3/2003 | Leung | |
| 2005/0172980 | A1 | | 8/2005 | Julemont | |
| 2005/0252521 | A1 | | 11/2005 | Leblanc | |
| 2006/0237418 | A1 | * | 10/2006 | Bousfield | A45D 1/10 219/225 |
| 2007/0175881 | A1 | | 8/2007 | Yeung | |
| 2007/0278205 | A1 | | 12/2007 | Pencook | |
| 2010/0083978 | A1 | | 4/2010 | Hottenrott et al. | |
| 2010/0263684 | A1 | * | 10/2010 | De Benedictis | A45D 2/02 132/272 |
| 2011/0284020 | A1 | | 11/2011 | Tam | |
| 2012/0111354 | A1 | | 5/2012 | Cafaro | |
| 2012/0145180 | A1 | | 6/2012 | Rong | |
| 2013/0025621 | A1 | | 1/2013 | De Benedictis | |
| 2013/0068245 | A1 | | 3/2013 | De Benedictis et al. | |
| 2013/0125919 | A1 | | 5/2013 | De Benedictis et al. | |
| 2013/0233883 | A1 | | 10/2013 | Story | |
| 2013/0263882 | A1 | | 10/2013 | Kim et al. | |
| 2013/0263883 | A1 | | 10/2013 | Story | |
| 2014/0076348 | A1 | | 3/2014 | Deng | |
| 2014/0366909 | A1 | * | 12/2014 | Richmond | A45D 2/36 132/211 |
| 2016/0237418 | A1 | | 8/2016 | Hellmuth et al. | |

FOREIGN PATENT DOCUMENTS

| | | | |
|---|---|---|---|
| CN | 202680933 | U | 1/2013 |
| CN | 202722897 | | 2/2013 |
| CN | 202722897 | U | 2/2013 |
| CN | 203207435 | | 9/2013 |
| CN | 203207435 | U | 9/2013 |
| CN | 104366944 | A | 2/2015 |
| CN | 204336124 | U | 5/2015 |
| CN | 204670560 | U | 9/2015 |
| DE | 8206841 | | 7/1982 |
| DE | 8206841 | U1 | 7/1982 |
| DE | 4312453 | | 10/1994 |
| DE | 4312453 | A1 | 10/1994 |
| EP | 0057094 | | 8/1982 |
| EP | 0057094 | A2 | 8/1982 |
| EP | 0571389 | | 6/1996 |
| EP | 0571389 | B1 | 6/1996 |
| EP | 2622989 | | 8/2013 |
| EP | 2622989 | A1 | 8/2013 |
| EP | 2392222 | | 9/2013 |
| EP | 2392222 | B1 | 9/2013 |
| FR | 1327927 | | 5/1963 |
| FR | 1327927 | A | 5/1963 |
| FR | 2879415 | | 6/2006 |
| FR | 2879415 | A1 | 6/2006 |
| GB | 1530360 | | 10/1978 |
| GB | 1530360 | A | 10/1978 |
| GB | 2277261 | | 10/1994 |
| GB | 2277261 | A | 10/1994 |
| JP | 3988960 | | 10/2007 |
| JP | 3988960 | B2 | 10/2007 |
| JP | 3185229 | | 8/2013 |
| JP | 3185229 | U | 8/2013 |
| KR | 1020020015082 | | 2/2002 |
| KR | 1020020015082 | A | 2/2002 |
| KR | 101166913 | | 7/2012 |
| KR | 101166913 | B1 | 7/2012 |
| KR | 101263801 | | 5/2013 |
| KR | 101263801 | B1 | 5/2013 |
| KR | 101326212 | | 11/2013 |
| KR | 101326212 | B1 | 11/2013 |
| WO | 2011124137 | A1 | 10/2011 |

OTHER PUBLICATIONS

¾ Clipless Curling Iron—19mm—Turquoise, Brilliance new York, http://www.brilliancenewyork.com/product/34-clipess-curling-iron-19mm-turquoise/., (Screenshot taken on Nov. 25, 2013).

International Search Report dated Feb. 4, 2015 of International application No. PCT/US2014/064082 (3 pages).

(56) References Cited

OTHER PUBLICATIONS

Written Opinion dated Feb. 4, 2015 of International application No. PCT/US2014/064082 (6 pages).
Notification of Second Chinese Office Action dated Jul. 3, 2018, for Chinese Patent Application No. 201410084698.X.
Cortex Clipless Curling Iron, Folica, http://www.folica.com/tools/curling-irons/cortex-clipless-curling-iron#tab=overview, as viewed on the Way Way Back Machine dated May 7, 2013, https://web.archive.org/web/20130612074603/http://m.folica.com/tools/curling-irons/cortex-clipless-curling-iron.
Evaluation Report of Utility Model Patent No. ZL2014201064595, dated Jun. 4, 2015.
Sedu Revolution Clipless Curling Iron, Folica, http://www.folica.com/tools/curling-irons/sedu-revolution-clipless-curlin- g-iron, (Screenshot taken on Nov. 25, 2013).
Cortex Clipless Curling Iron, Folica, http://www.folica.com/tools/curling-irons/cortex-clipless-curling-iron#tab=overview, (Screenshot taken on Nov. 25, 2013).
Japanese Office Action dated Jul. 14, 2015 of Japanese application No. 2014-134312.
Communication pursuant to EPC Article 94(3) dated Feb. 6, 2018 for European Application No. 14860385.5.
Extended European Search Report dated Feb. 7, 2018 for European Application No. 17201455.7.
Examination Notice dated Feb. 7, 2018 for Taiwanese Application No. 106106308.

* cited by examiner

HAIR STYLING APPARATUSES AND RELATED METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

The present application is a continuation-in-part of U.S. application Ser. No. 14/980,280, filed on Dec. 28, 2015, which claims priority to Korean Application No. 10-2015-0007396 filed on Jan. 15, 2015, the entire contents of each of which are hereby incorporated by reference.

FIELD OF TECHNOLOGY

This disclosure relates generally to hair styling devices, and more specifically to hair curling devices and related system and methods.

BACKGROUND

The present disclosure relates generally to hair styling devices that assist a user to gather and wrap the user's hair by a rotating member to form curls such that it can be used not only for users with long hair but also for users with short hair. Heated styling irons (e.g., curling irons) are used to form hair to a wide variety of styles, such as curling hair to impart a curl that does not naturally occur or straightening hair to remove a kink or curl. For example, a circular or semicircular-shaped curl can be created by wrapping hair around the outer surface of a heated cylindrically shaped curling iron tip.

Conventional curling irons include a cylindrical curling mandrel having a clamping member that fits about a portion of the mandrel. During use, the curling mandrel can be heated and a strand of hair is clamped against the mandrel by the clamping member. Hair can be curled by rotating the mandrel to cause the clamped hair to be wrapped around the mandrel. Heat applied to the mandrel can alter the texture of the hair so as to curl it. After a predetermined amount of time, the clamping member is moved away from the mandrel, and the curled hair is unwound. Some conventional devices include a motorized heated mandrel that can rotate to wind hair around the mandrel using an electric motor.

However, conventional styling straighteners do not have a function to prevent the user's skin from being burnt by the straightener's heat, and there have been burn problems in the process of user's hair styling.

SUMMARY

In some aspects, a hair styling apparatus (e.g., hair curling device) can include a heated barrel defining a hair styling surface and a central axis and a rotating member disposed at an end of the hair styling surface. The rotating member is configured to rotate around the central axis of the heated barrel. The rotating member includes one or more retaining elements configured to retain the hair and wind the hair around the hair styling surface. The one or more retaining elements projects away from the hair styling surface.

In some aspects, a method includes positioning a hair styling device in proximity to a user's head. The hair styling device includes (1) a heated barrel defining a hair styling surface and a central axis, and (2) a rotating member disposed at an end of the hair styling surface. The rotating member is configured to rotate around the central axis and includes one or more retaining elements projecting away from the hair styling surface. Hair attached to the user's head is retained within the rotating member of the hair styling device. The retained hair is wrapped around the hair styling surface to impart a curl in the hair by rotating the rotating member around the hair styling surface to wind the hair around the hair styling surface.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION

Figure 1:
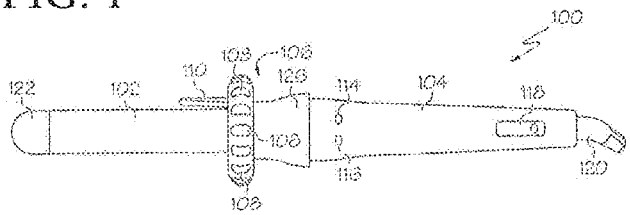
FIG. 1 is a side view of an example hair curling device having a rotating member to curl hair around a stationary heated barrel.
Figure 2:
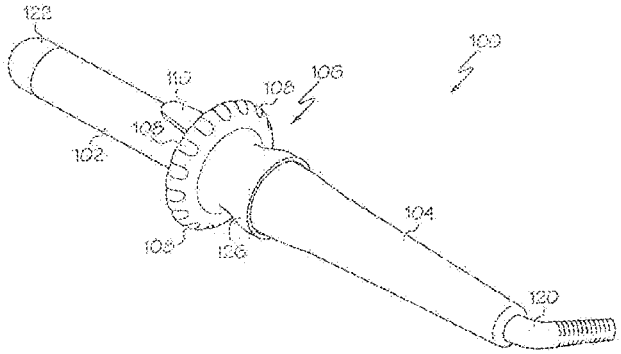
FIG. 2 is a perspective view of the hair curling device of FIG. 1.
Figure 3:
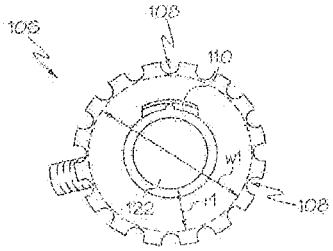
FIG. 3 is a front view of the hair curling device of FIG. 1 illustrating recessed hair retaining elements and a radial spacing between the hair retaining elements and the heated barrel.

The above and other features of the present invention, its nature and various advantages will be more apparent upon consideration of the following detailed description, taken in conjunction with the accompanying drawings, in which like reference characters refer to like parts throughout.

Hair curling devices that include a rotating member configured to rotate and wrap hair around a generally stationary heated barrel can be used to curl a user's hair snore easily than with some other conventional curling devices.

In some embodiments, referring to FIGS. 1-4, a hair styling (e.g., curling) device or apparatus 100 can include a heated barrel (e.g., a generally cylindrical barrel) 102 coupled to a housing (e.g., a handle) 104. The barrel 102 defines a hair styling surface that typically does not rotate relative to (e.g., is rotatably coupled to) the handle 104 and provides a device around which hair can be wrapped and heated to create curls. The barrel 102 typically includes a heating element (e.g., a ceramic heating element) 103 configured to heat at least a portion of the barrel 102, such as the hair styling surface, to curl the user's hair. A heat selection switch 118 can be arranged along the handle, which is configured to permit the user to select among one of several different heat settings, such as a high temperature setting and a low temperature setting.

The barrel 102 is typically formed from a thermally conductive metal material, such as aluminum, iron, steel, silver, or one or more other metals, that is surrounded (e.g., coated or wrapped) with a material that is less thermally conductive than the barrel (e.g., a thermally non-conductive material) that is configured to limit damage to the hair, such as a ceramic material or Tourmaline. The barrel 102 can be formed in various widths (e.g., diameters) based on the intended curls desired by the user. In some embodiments, the barrel 102 can have a diameter that is about 0.375 inches to about 2.5 inches (e.g., about 0.5 inches to about 1.5 inches). In the example illustrated, the barrel 102 has a diameter that is about 1.0 inches.

A tip (e.g., a heat insulated cooling tip) 122 can be disposed at a free, exposed end of the barrel 102. In some embodiments, the free end of the barrel is disposed opposite the handle. The cooling tip 122 can help to reduce the likelihood that the user will burn themselves with the heated barrel 102, for example, by creating a physical barrier between the end of the barrel 102 and the user's head. As illustrated, the free, exposed end of the styling device (e.g., exposed, free end of the barrel and styling surface) is typically free of hair capturing housings or enclosures. That is, the barrel is typically unenclosed and open to the surrounding environment so that hair can be more easily captured and wrapped around the hair styling surface and also more easily removed. In some cases, such an enclosure or housing could create an obstruction that may make it more difficult for the user to easily remove hair from the styling device. For example, hair could get wound around one or more surfaces of the enclosure making it difficult to remove from the hair.

A rotating member 106 is mounted generally at an end of the barrel 102 (i.e., at an end of the hair styling surface) adjacent to the handle 104. The rotating member 106 is rotatable relative to the hair styling surface of the barrel and typically also the handle 104 as the handle 104 and the barrel 102 can be coupled to one another. A drive motor 107 (illustrated more particularly in the embodiments depicted in FIGS. 5-9), which can be mounted in the handle (e.g., in a motor holding chassis) is configured to rotate the rotating member 106 relative to the handle 104 and the barrel 102. The drive motor 107 is typically an electric motor (e.g., an AC or a DC electric motor). Electricity can be provided to the drive motor using a rotatable power cord (e.g., a swivel power cord) 120 and directional switches 114, 116 that can cause the motor to rotate in different (e.g., opposite) directions. An electrical circuit (e.g., a printed circuit board) 117 (also illustrated in the embodiments depicted in FIGS. 5-9) can be arranged within the handle or another component to distribute electrical signals from the various switches to the motor 107 and heating element 103. While the handle 104 is illustrated as generally being a cylindrical member formed in-line with the heated barrel 102, other configurations are possible. For example, in some embodiments, the handle can be a pistol grip-like handle that is arranged at an angle (e.g., substantially perpendicular) relative to the heated barrel.

The hair curling device 100 can include any of various drivetrain components (e.g., gear systems or transmission devices) to convert the rotation of the motor into the rotation of the rotating member 106. The drive motor (including any drivetrain components) can be configured to rotate the rotating member 106 at any of various suitable speeds. For example, the drive motor can cause the rotating member 106 to rotate at about 10 rpm to about 300 rpm (e.g., about 20 rpm to about 100 rpm, e.g., about 50 rpm to about 100 rpm). Bearing elements can be disposed between the rotating member 106 and the barrel 102 or handle 104 to help reduce and limit rotational friction so that the rotating member 106 can rotate more easily relative to the barrel 102.

The rotating member 106 is typically configured to rotate relative to the barrel 102 (e.g., around the hair styling surface) to receive (e.g., gather, grasp, retain, trap, grip, pick, or otherwise attach) hair and wrap the hair around the heated barrel 102 to be curled as it rotates. As illustrated, the rotating member 106 includes one or more hair retaining elements 108 configured to receive the user's hair (e.g., one or more hairs) so that the hair can be wrapped around the styling surface of the heated barrel 102 for curling. The rotating member 106 typically includes multiple retaining elements 108 that are distributed circumferentially around its perimeter region. In some cases, including multiple retaining elements 108 can help the hair curling device more easily retain and wrap hair around the barrel 102 in a more uniform and even distribution.

The rotating member 106 and the retaining elements 108 are typically longitudinally spaced away from the barrel (e.g., the hair styling surface of the barrel) and disposed at an end of the barrel adjacent the handle 104. That is, the hair styling surface can be positioned at the free, exposed end of the hair styling device relative to the rotating member 106. As discussed below and illustrated in FIGS. 10A-11B, such a configuration can assist the user to place the free end of the curling device towards their head so that the rotating member can gather the user's hair and wrap the free end of the hair around the heated barrel 102. In other words, hair is typically gathered using the rotating member and wound around the hair styling surface from an end opposite the free end of the hair styling surface.

Figure 4:
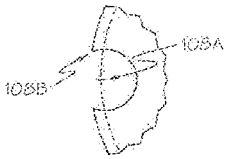
FIG. 4 is an enlarged view of the rotating member of FIG. 1 illustrating a hair retaining element.
Figure 5:
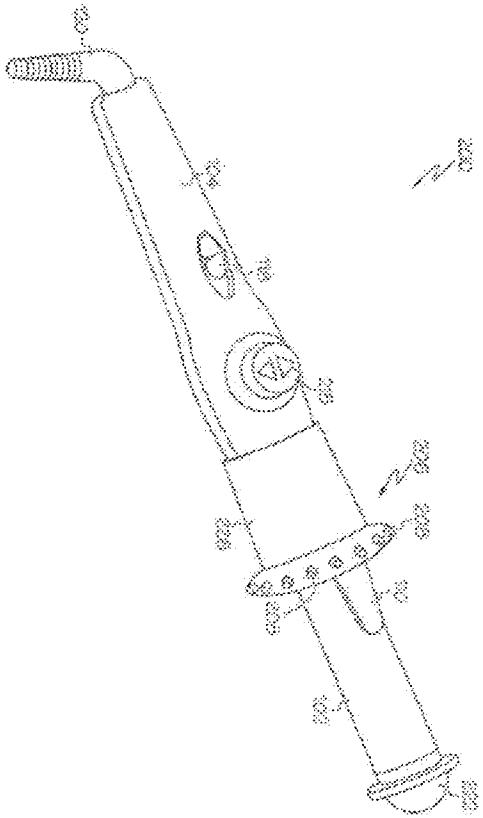
FIG. 5 is a perspective view of another example hair curling device having a rotating member with projection-like hair retaining elements to grasp and curl hair around a stationary heated barrel.
Figure 6:
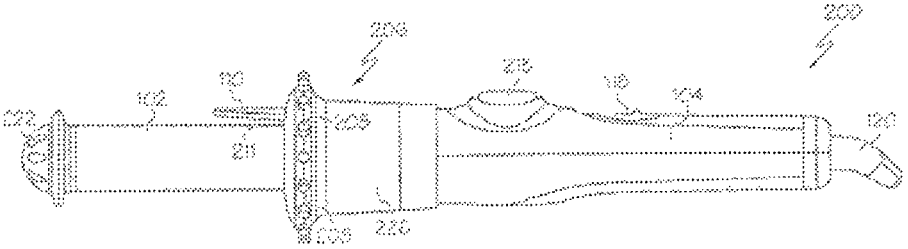
FIG. 6 is a side view of the hair curling device of FIG. 5.
Figure 7:
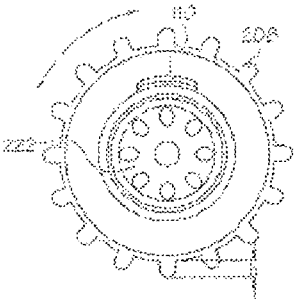
FIG. 7 is a front view of the hair curling device of FIG. 5 illustrating a length of projection-like elements.

Retaining elements formed along the rotating member can include any of various types of features capable to catch or gather one or more hairs. For example, the retaining elements can include one or more of hooks, recesses (e.g., semi-circular holes or other depressions), protrusions (e.g., knobs, pins, bristles, bosses), or any suitable combinations or these of other suitable elements. As shown in FIGS. 1-4, in some examples, the rotating member 106 can include multiple recess-like retaining elements 108 that are formed circumferentially around an outer (e.g., peripheral) region around the rotating member 106. Recess-like retaining elements can be formed in any of various shapes and sizes to suitably gather the user's hair. In some embodiments, retaining elements can have a depths or width (e.g., diameter) of at least 0.5 millimeters (e.g., about 1 millimeter to about 10 millimeters). In the example illustrated, the semi-circular retaining elements 108 can have a diameter that is about 6 millimeters. Referring particularly to FIG. 4, recess-like retaining elements 108 can be formed within a peripheral region of the rotating member such that their central axes 108A are arranged within the rotating member so that at least half of the recess (e.g., at least half of a semi-circular recess) is enclosed. Put differently, the retaining elements 108 can include portions (e.g., entraining portions) 108B of the rotating member that extend inwardly towards the recess to partially enclose the retaining elements. The entraining portions 108B can help to retain hair within the retaining elements as the rotating member rotates.

In some cases, the retaining elements 108 are distributed substantially evenly around the rotating member. In some embodiments, retaining elements can be arranged about every 5 degrees to about 10 degrees around the peripheral region of the rotating member. Additionally or alternatively, in some embodiments, the retaining elements can be arranged about every 0.125 inches to about 0.75 inches around the peripheral region of the rotating member.

Retaining members can be arranged in a width (e.g., diameter) w1 that is at least 20 percent greater than the diameter of the barrel around which they rotate. For example, retaining members can be arranged along a peripheral region of the rotating member in a diameter w1 of about 1 inch to about 5 inches (e.g., about 2 inches to about 3.5 inches). In some cases, the diameter w1 around which the retaining elements are positioned can be at least about 20 percent larger than the diameter of the barrel. In the example illustrated, a diameter w1 defined by the retaining elements 108 is about 2 inches.

As illustrated, the retaining elements are typically spaced radially away from the barrel 102 by a separating spacing r1 so that hair retained by the rotating member is generally spaced away from the heated barrel 102. Spacing the retaining elements 108 radially away from the barrel 102 in this manner can help reduce the likelihood of hair tangling when first grasped by the rotating member 106. In some embodiments, a radial spacing r1 between the hair styling surface of the barrel and the retaining members can be 0.125 inches to about 2 inches. In the example illustrated, the radial spacing is about 0.5 inches.

The rotating member 106 typically can also include a hair holding tab 110 that extends generally longitudinally along the hair styling surface the heated barrel 102. As the retaining elements 108 catch and rotate (e.g., twist, curl, wrap, spiral, or otherwise displace) hair around the barrel 102, the holding tab 110 helps to further catch hair and direct and guide it against and around the barrel 102 so that the hair spirals around the barrel rather than just twisting or tangling. In some embodiments, the tab 110 can have a length to extend onto the hair styling surface about 5 millimeters to about 50 millimeters. The tab 110 can be spaced from the hair styling surface by about 0.5 millimeters to about 10.0 millimeters to provide adequate room for hair to fit between the tab 110 and barrel 102.

In some cases, the holding tab 110 can include a surface or insert of a material that helps to create additional friction against the hairs to grip and wrap the hairs around the barrel 102. For example, the insert can include an insert made of silicone or one or more other fluoroelastomers disposed between holding tab 110 and the barrel 102 to help generate a frictional force against the hair depressed between the tab and the hair styling surface of the barrel. Additionally or alternatively, in some embodiments, the insert can be in the form of a coating formed along the holding tab. Like the tab 110, the insert can be spaced from the hair styling surface, for example, by about 0.5 millimeters to about 10.0 millimeters to provide adequate room for hair to fit between the insert and barrel 102.

The rotating member 106 typically has a generally cylindrical hair loading region 126 along which hair that is about to be retained by the retaining elements 108 and wound around the barrel 102 can lie. As illustrated, the hair loading region 126 is typically longer relative to the other portions of the rotating member 106 and is positioned at an end away from the barrel 102 when the rotating member 106 is mounted on the hair curling device 100. In some embodiments, the hair loading region 126 can have a length that is about 5 millimeters to about 70 millimeters. However, other position configurations are possible. The hair loading region can be formed integrally within the rotating member or, in some cases, can be manufactured as a separate component joined (e.g., fastened) to the rotating member. The hair loading region 126 typically serves to help reduce the likelihood that hair becomes inadvertently wound around the rotating member 106 and tangled before it can be wrapped around the barrel 102.

Wrapping the user's hair around the barrel 102 in this manner, including winding the hair around the relatively stationary (i.e., non-rotating) barrel 102 using the rotating member 106 rather than clamping the hair to the barrel and rotating the barrel itself can result in fewer snags, tangles, or pulled hairs during use. This enhanced performance is, at least in part, a result of the hair being pulled loosely by the retaining elements 108 and the holding tab 110, neither of which tightly clamp onto the hair. In other words, when the rotating member 106 rotates to grip and rotate (e.g., twist, curl, wrap, spiral, or otherwise displace) hair (rather than clamping hair to the barrel and rotating it), the hair is guided around the barrel 102 and as it is formed into a spiral-like curl, it is tightened to the stationary barrel rather than a moving part, which could cause the hair to be pulled causing discomfort. Therefore, the rotating members described herein can typically reduce (or in some embodiments eliminate) the need for additional protection components such as clutches or sensor systems.

Another example automated hair styling apparatus (e.g., hair curling device) having a stationary hair styling surface of a heated barrel around which hair can be wrapped and curled is illustrated in FIGS. 5-9. For example, a hair curling device 200 can include a rotating member 206 configured to retain and wind the hair around the heated barrel 102 to curl the hair. Similarly to the rotating member 106 described above, the rotating member 206 can include retaining elements spaced away from one another to engage one or more hairs of the user. As discussed above, retaining elements can include any of various types of features capable to catch one or more hairs, such as one or more of hooks, recesses, protrusions (e.g., knobs, pins, bristles, bosses), or any suitable combinations of these of other suitable elements. As shown in the example illustrated, the rotating member 206 can include multiple knob-like protrusions 208 that extend outward radially and are disposed circumferentially around the rotating member 106.

Knob-like protrusion retaining elements can be formed in any of various sizes to suitably gather the user's hair. In some embodiments, protrusion retaining elements 208 can have a height h that is about 0.5 millimeters to about 10 millimeters outward radially from the rotating member 206.

In some embodiments, protrusion retaining elements 208 can have a width that is about 1 millimeter to about 3 millimeters (e.g., about 1 millimeter to about 2 millimeters).

In some cases, the retaining elements 208 are distributed substantially evenly around the rotating member. The spacing of adjacent retaining elements 208 can help to create recess-like regions in which hair can lie and be retained.

The rotating member 206 includes a hair loading region 226 positioned away from the barrel 102 that can help to limit hair from getting wound and tangled around the rotating member 206. In some embodiments, the hair loading region 226 can include a tapered portion that increases in width (e.g., diameter) as it leads into the retaining elements 108. Such a tapered portion can help gradually push the hair outward radially so that it can more easily be retained by the retaining members.

The rotating member 206 can include a friction insert (e.g., a silicon insert) 211 disposed along an inner surface of the hair holding tab 110. As mentioned above, as the retaining elements 108 catch and twist hair around the barrel 102, the holding tab 110 helps to press the hair against the barrel 102 for better contact with the barrel 102. The friction insert 211 helps to create friction to wrap the hair around the barrel 102 without firmly clamping or gripping.

A tip (e.g., a heat insulated cooling tip) 222 can be arranged at the exposed, free end of the barrel 102. As illustrated, in some cases, at least a portion of the cooling tip 222 has a width (e.g., diameter) that is larger than the barrel 102 to help keep the user from accidently placing the sides of the barrel 102 on their head. The larger diameter region can also provide a stop to limit hair from slipping off the end of the barrel.

Figure 8:
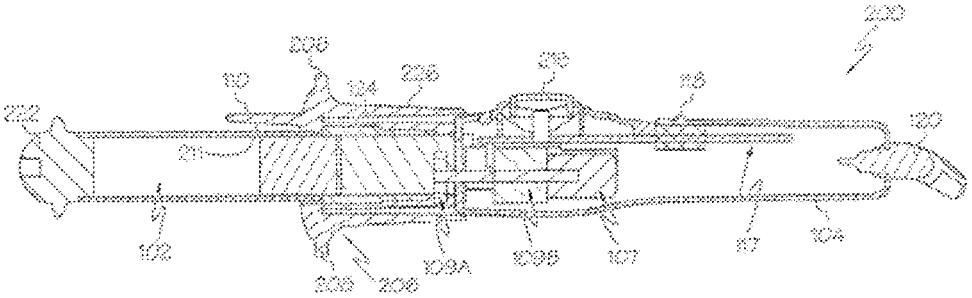
FIG. 8 is a cross-sectional side view of the hair curling device of FIG. 5 illustrating inner components that drive the rotating member.
Figure 9:
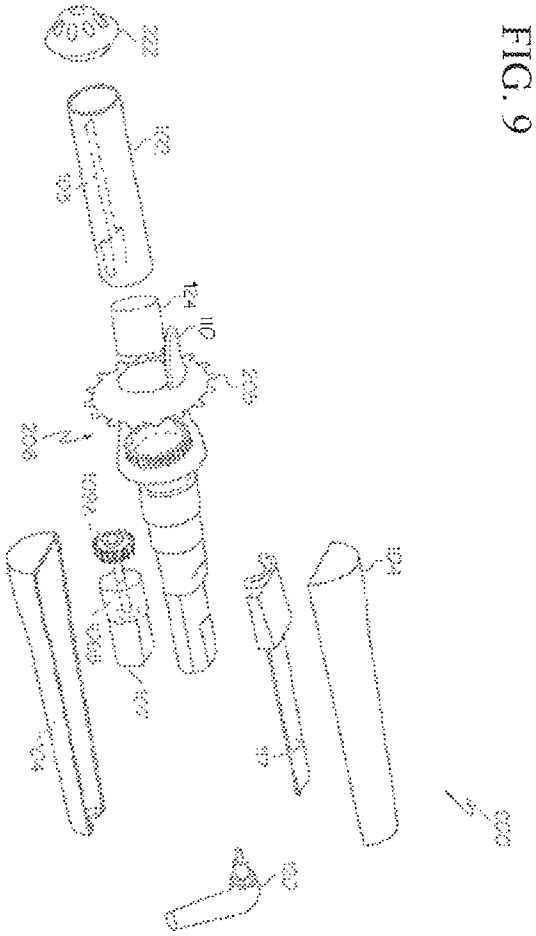
FIG. 9 is an exploded, perspective view of the hair curling device of FIG. 5.

As illustrated in FIGS. 8 and 9, drivetrain components, such as gear systems 109A or transmission devices 109B, can be used to convert the rotation of the motor 107 into the rotation of the rotating member 206. Like the hair curling device 100, the drive motor 107 of the curling device 200 can cause the rotating member 206 to rotate at about 10 rpm to about 300 rpm (e.g., about 20 rpm to about 100, e.g., about 50 rpm to about 100 rpm). Referring particularly to FIG. 8, a bearing element 124 can be disposed between the rotating member 206 and the barrel 102 or handle 104 to help reduce and limit rotational friction so that the rotating member 206 can rotate more easily relative to the barrel 102.

The hair curling device 200 also includes directional switch (e.g., a toggle switch) 215 that can be used to change the rotational direction of the barrel 102 so that the user can create differently shaped curls. In some examples, the switch 215 can be a rocker switch, such as a three position rocker switch, that can change the direction of the barrel from left (e.g., counterclockwise), stop, and right (e.g., clockwise).

Unless otherwise explicitly noted or described, the hair curling device illustrated in FIGS. 5-9 can include similar or same components as those of the hair curling device 100. Similarly, the hair curling device 100 can include components or features described with respect to the hair curling device 200.

As discussed above, the hair styling devices as described generally herein (e.g., the hair styling device 100 or the hair styling device 200) can assist the user to place the styling device near their head so that the rotating member can automatically gather and wrap the hair to form curls by withdrawing free ends of the hair upwardly onto the heated barrel while limiting the risk of inadvertently pulling the hair from the user's head.

Figure 10A:
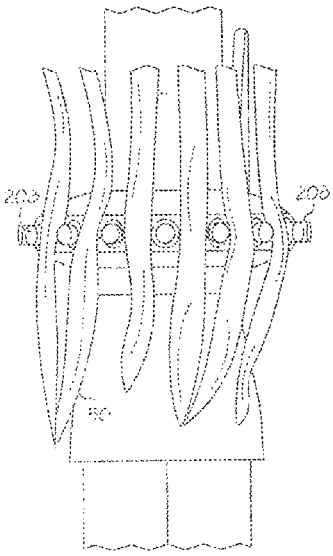
FIGS. 10A-10C are sequential views depicting a hair curling method implementing an example hair curling device.
Figure 10B:
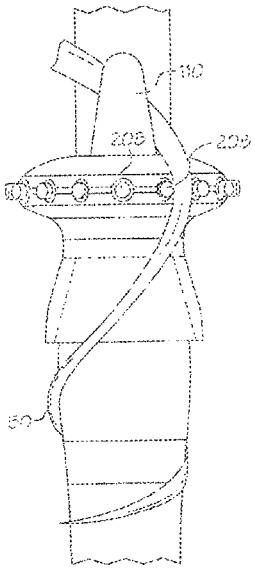
Figure 10C:
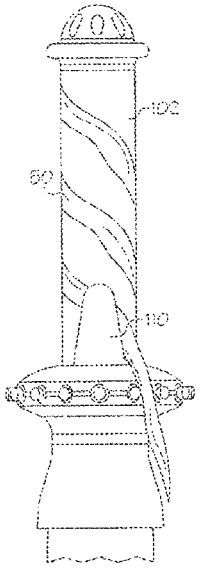

FIGS. 10A-10C depict a hair curling sequence that can be implemented using one of the hair curling devices described herein (e.g., the hair curling device 100 or the hair curling device 200). In some examples, the user can place the hair curling device against their hair with the cooling tip 122 directed towards their head. As depicted in FIG. 10A, hair can fall and lie along the rotating member and in particular, within the retaining elements. As mentioned above, the retaining elements are typically distributed apart from one another to comb through the hair to limit or prevent tangling.

As the rotating member begins to rotate relative to the generally cylindrical barrel, for example, as a result of the user pressing one of switches 114, 116, the retaining members begin to wrap the hair around the barrel, as depicted in FIG. 10B. For simplicity, only one hair is shown in FIGS. 10B and 10C. As the hair is wound around the barrel, the holding tab can press and keep the hair on the barrel. Referring to FIG. 10C, the hair can continue to wind around the barrel as it is heated to form a curl in the hair. The user can either continue or stop the rotating member while the hair is being heated and curled.

After a period of time has passed and the hair is heated, the user can remove the hair curling device from their hair. As discussed above, since the hair is not directly grasped, pinched, or held by the rotating member or the barrel (e.g., as would be the case for a curling iron with a clamp), the user can typically just pull the hair curling device away from their head. When pulled away, the hair can typically become loosened from the barrel and slide through the retaining elements.

Figure 11A:
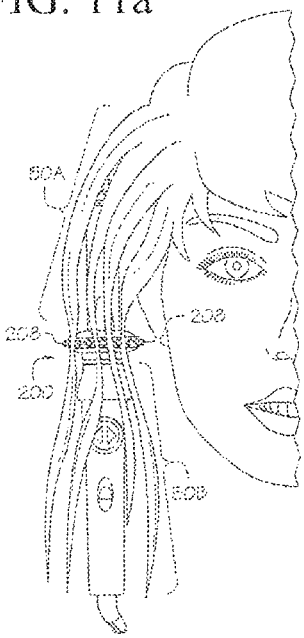
FIGS. 11A-11B are sequential views depicting the hair curling method implementing an example hair curling device illustrating how hair can be gathered and curled by the hair curling device.
Figure 11B:
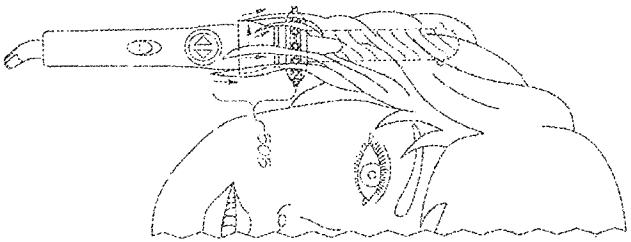

In another example, referring to FIG. 11A, the user can position a free end of a hair styling surface (e.g., defined by a heated barrel) of a hair styling device, such as the hair curling devices 100, 200 discussed above, in proximity to (e.g., at or near) the user's head. In some embodiments, the hair curling device (i.e., a longitudinal axis of the hair styling surface) can be positioned substantially vertically next to the user's head. As illustrated, hair can be retained (e.g., gathered) within a rotating member of the hair styling device. For example, hair can be gathered by retaining elements 108 of the rotating member. As shown, the hair can be retained at an end of the hair styling surface that is opposite the free end of the styling device.

Hair can then be wrapped around the heated hair styling surface. For example, referring to FIG. 11B, the rotating member can be driven to rotate relative to the hair styling surface based on an input from the user. In some embodiments, the rotating member can be driven in response to the user pressing a directional button on the handle. As illustrated, a portion 50A of the hair in proximity to (e.g., closest to) the user's head is first wrapped around the hair styling surface and a length of the free end (e.g., a free length or free end region) 50B of the hair decreases as the hair is wrapped around the hair styling surface. That is, as hair is wound, the portions closest to the head can first be wrapped around the barrel and the free length (e.g., the amount of hair that lies free from the styling device) 50B can be drawn up to the styling surface as the rotating member rotates and guides the hair through the retaining elements.

In some cases, as the rotating member rotates, additional hair can be gathered and retained automatically by the retaining elements of the rotating member. As the hair is wrapped around the heated hair styling surface, a curl can be imparted in the hair. As the rotating member rotates, the tab extending from the rotating member can be used to depress some or all of the hair against the hair styling surface at the end of the styling surface opposite the free end.

As illustrated, as the hair is wrapped around the hair styling surface, free end regions of the hair can be drawn through one or more regions (e.g., retaining elements) of the rotating member and onto the hair styling surface.

In some embodiments, the rotating member can continuously rotate about the barrel after the hair has been fully wrapped. In some cases, the rotating member can continue to rotate until the user releases the directional button (or presses a stop button) on the handle.

After a period of time has passed and the hair is heated, the user can remove the hair curling device from their hair. As discussed above, since the hair is not directly gasped, pinched, or held by the rotating member or the barrel (e.g., as would be the case for a curling iron with a clamp) or enclosed by a hair capturing housing or enclosure, the user can typically just pull the hair curling device away from their head. When pulled away, the hair can typically become loosened from the barrel and slide through the retaining elements.

Figure 12:
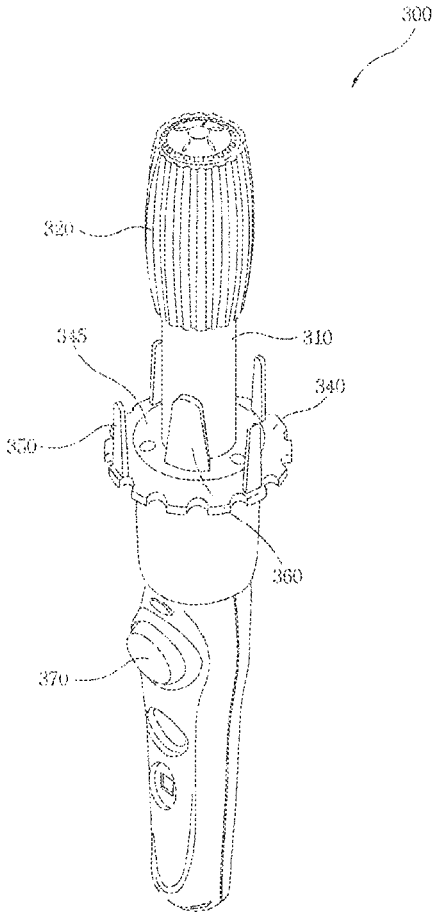
FIGS. 12 and 13 are perspective views of another example hair curling device.
Figure 13:
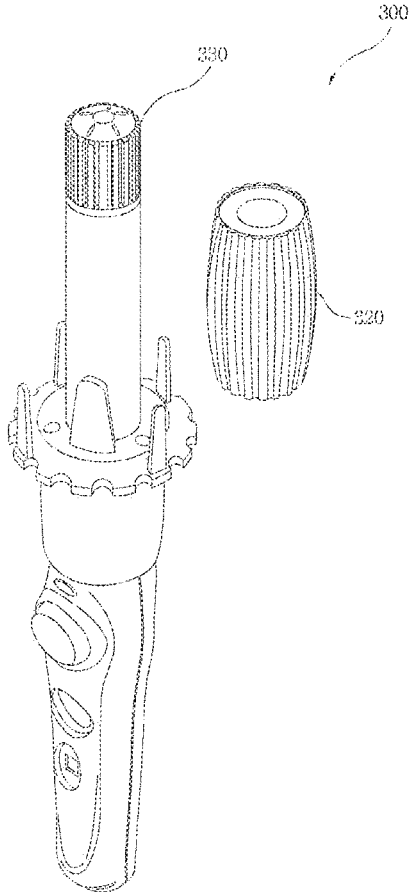
Figure 14:
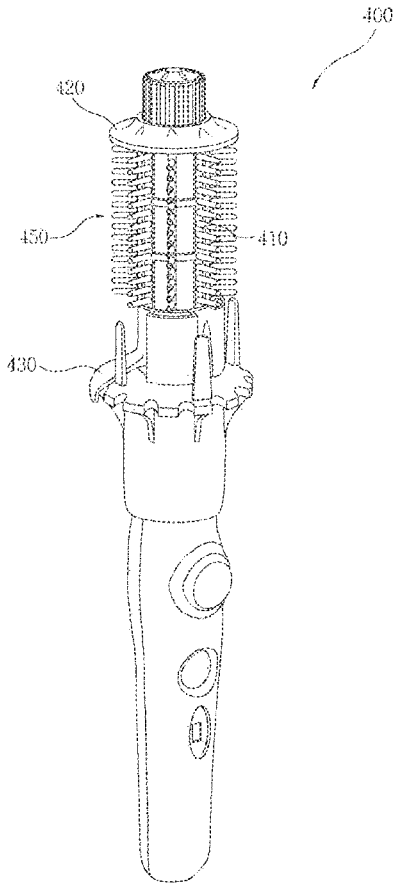
FIGS. 14 and 15 are perspective views depicting a comb of another example hair curling device for short hair styling.
Figure 15:
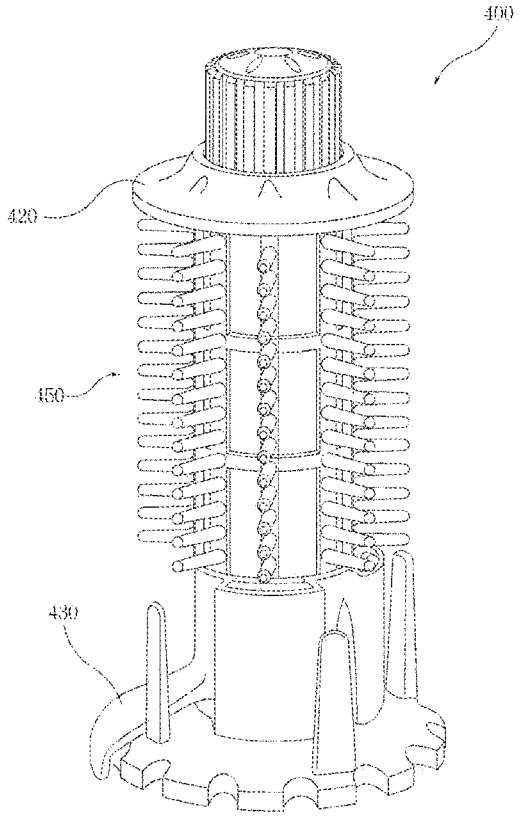

By referring to FIG. 12 or 15, the hair styling device is explained according to mother example of this invention. FIGS. 12 and 13 are simplified perspective views of the hair styling device according to another example of this invention. FIGS. 14 and 15 are diagrams according to another example of presenting an implemented shape of the comb, which can do a short-hair styling and is included in the hair styling device.

As in FIGS. 12 and 13, the hair styling device 300 according to another embodiment of this invention may include burn prevention cover 320, rotating member and guide pin 350 that are composed of two different parts.

The burn prevention cover 320 is attached to the thermal safe tip 330 of the free end of the barrel 310, blocks the user's skin to touch the barrel 310, and disperses the heat from the barrel 310 to outside. In this way, the burn prevention cover 320 prevents the heated barrel 310 from touching the user's skin, and by sending out the heat from the heated barrel 310, it may reduce or remove the risk of burns to the user.

Figure 16:
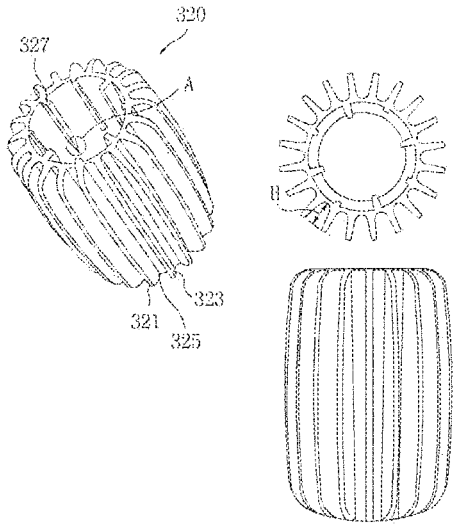
FIGS. 16 and 17 are perspective views of various burn prevention cover of another example hair curling device.

As in FIG. 16, this type of burn prevention cover 320 is a cylindrical shape with the hollow center, and there are plural outer ribs 321, 323 in the cylindrical circumference vertically positioned away from each other. The burn prevention cover 320 is attached to the barrel 320's free end of the thermal safe tip 330 through the hollow center and is disposed at the barrel 310.

Moreover, as there is a dented valley 325 between the neighboring outer ribs 321, 323 due to the height of the rib H, the circumference of the cylindrical shape may consist of the outer rib and valley 325. This outer rib touches the user's skin directly, and the valley 325 may be the area that disperses the heat from the heated barrel 310 to outside, and specifically, the area of the burn prevention cover 320 extends by this valley 325, the valley 325 activates the natural air cooling that disperses the heat from the barrel 310 to outside, and as a result, the temperature of the outer ribs 321, 323 that touches the user's skin drops to the extent that the skin does not get burn.

As discussed above, because the neighboring outer ribs 321, 323 create one valley 325, the number of the outer ribs 321, 323 determines the number of the valley 325, and there may be more than three of this type of outer ribs 321, 323, or there may be 10 or 20 of outer ribs 321, 323 in order to improve the heat dispersion effect by creating a number of valleys 325, or there may be various numbers of outer ribs 321, 323 depending on the effectiveness of the intended heat dispersion.

In addition, not only the number of the outer ribs 321, 323 but also the height of the outer ribs 321, 323 greatly influences the functionality of the burn prevention cover 320, and specifically, the height H of the outer ribs 321, 323 changes the size of the valley 325 and heat amount delivered to the user's skin from the barrel 310, accordingly by considering this, the height H of the outer ribs 321, 323 may be over 1 mm, although it can be 8 mm in some cases, but if the burn prevention effect can be achieved, there is no limit in the height H of the outer ribs 321, 323.

Meanwhile, the bottom part B of the outer ribs 321, 323 of the burn prevention cover 320 may be a shape with a taper. Related to this, in the usage process of the hair styling device 300 following another example of this invention, the user may push down the hair styling device 300 vertically at the last stage after the user's hair is wrapped in the barrel 310. As the burn prevention cover 320 is disposed at the barrel 310, there may be cases where in the process of pushing down the hair styling device 300, the hair is entangled with the bottom part of the burn prevention cover 320 or the burn prevention cover 320 may not be pulled out of the hair, and in order to prevent this from happening, the end part neighboring the handle device among the outer ribs 321, 323's end may be tapered and be slanted.

Next, inside the burn prevention cover 320, the plural inner ribs 327 positioned vertically inside the cylindrical shape that defines the hollow center may be shaped positioned away from each other. The inner rib 327 can be disposed at the vertical directional holm in the barrel 310's free end, and through this, the burn prevention cover 320 may be disposed at the barrel 310.

If you look at the specific shape of the inner rib 327, the end A neighboring the handle device among the inner rib 327 end formed vertically with the cylindrical shape is tapered, and the tapered shape may be a form created as a result of both sides of the inner rib 327 being tapered toward the center of the inner rib 327. In this way, as the inner rib 327's end A is tapered, the burn prevention cover 320's inner rib 327 can be properly fit into the holm formed in the barrel 310's thermal safe tip 330. Depending on some cases, there may be 4 inner ribs 327, but if the combination of the burn prevention cover 320 and barrel 310 is guaranteed, the number of the inner rib 327 may vary.

In this way, when the burn prevention cover 320 is disposed at the barrel 310's free end through the inner rib 327, a space that accepts the air between the burn prevention cover 320 and the barrel 310 may be formed, in which the minimum distance between the burn prevention cover 320 and the inner barrel 310's free end surface may be more than 1 mm.

Regarding this, as the air has low thermal conductivity, effectively blocking the barrel 310's heat from being delivered into the burn prevention cover 320, the hair styling device 300 following another example of this invention has a double-blocking method to prevent the barrel 310's heat from being delivered to the user, and specifically, it blocks the barrel 310's heat from being delivered into the burn prevention cover 320 by the air as the first stage, and it blocks the small amount of heat delivered through the air from being delivered to the user by the burn prevention cover 320 as the second stage.

As discussed above, in order to prevent user burn by the barrel 310's heat, two elements that are considered in designing the burn prevention cover 320 may be the shape and materials. As the shape of the burn prevention cover 320 has been explained above, below is the explanation of the materials of the burn prevention cover 320. The materials of the burn prevention cover 320 have relatively low thermal conductivity, and because they should be materials that do not easily melt by the heat, such materials of the burn prevention cover (320) may be one of liquid crystal polymer (LCP), polyphenylene sulfide (PPS), polyamide 66 (PA66), and high temperature plastic. Yet, the materials of the burn prevention cover 320 are not limited to these examples, and any materials that have low thermal conductivity and do not melt by heat may be fine.

Meanwhile, the thermal safe tip 330 of the barrel 310's free end with the burn prevention cover 320 may be a cool tip that disperses the heat from the heated barrel 310 and cools the barrel 310.

As in FIG. 12, as discussed above, the rotating member of the hair styling device 300 following another example may have two different parts, and the rotating member may include the inner rotating member 345 and the outer rotating member 340 positioned in the circumference of the inner rotating member 345. This rotating member may be in a form of a discus, have the barrel 310 be inserted into the hollow center area of the inner rotating member 345, and the outer rotating member 340 may be formed following the circumference of the inner rotating member 345.

Moreover, as the inner rotating member 345 is positioned nearer the heated barrel 310 compared to the outer rotating member 340, it can be made of materials that are strong against heat. Such material of the inner rotating member 345 can be one of liquid crystal polymer (LCP), polyphenylene sulfide (PPS), polyamide 66 (PA66), and high temperature plastic. The materials of the outer rotating member 340 may be one of polycarbonate (PC) and ordinary plastics.

A guide pin 350 is a pin that extends from the first end of the rotating member (i.e., among the upper and bottom sides of the rotating member, the side that faces the barrel 310's free end) to the barrel 310's free end following the barrel 310's length direction, and may play more than one role of pushing the user's hair into the barrel 310 and of preventing the hair from being entangled when it is wrapped around the barrel 310.

This type of guide pin 350 may be formed in part or entire part of the outer rotating member 340. In other words, the entire guide pin 350 may be formed in the outer rotating member 340, or a part of it is formed in the outer rotating member 340 and the rest is formed in the inner rotating member 345. The guide pin 350 may be formed more than two, there is no limitation in the number of the guide pin.

Additionally, the hair styling device 300 following another example of this invention may, as in the hair styling device according to this invention, include a fixed tab 360 and a heater.

The fixed tab 360, in order to capture and press the wrapped hair against the hair styling surface, extends from the first end of the rotating member through a part or the entire area of the hair styling surface, and this fixed tab 360 may be formed more than one at the inner rotating member 345.

The heater is positioned inside the barrel 310, which may be one of a PTC heater (Positive Temperature Coefficient Heater) which has a function of preventing overheats, MCH heater (Alumina Ceramics Heater), or coiled infrared rays heater. Additionally, the hair styling device following another example of this invention may include a controller that blocks overheats of the barrel 310.

Meanwhile, the diameter of the barrel 310 may vary upon the characteristics related to the user's hair, which may be more than one of, but not limited to, the thickness of the user's hair, hair damage condition of the user, or the user's ethnicity, and the diameter of the barrel 310 may vary depending on various considerations. Moreover, various types of curls are formed according to the barrel 310's diameter, the barrel with a big diameter makes a big curl such as beach wave, and the barrel with a small diameter may make a tight curl.

By referring to FIGS. 14 and 15, different from the hair styling device according to this invention discussed here, the hair styling device 400 may include a comb structure 450 that can be disposed at the barrel 310.

The comb structure 450 may be a round brush shape that can be disposed at the barrel 310, and this comb structure 450 may include the passage area that is disposed at the barrel 310, the heat of the comb tooth 410 formed along the length direction by connecting both sides, hook 430 and comb tooth protection cover 420.

Specifically, the comb tooth 450 includes three or more longitudinal rows of teeth 410, and the user may get burned when fingers or other physical parts of the user are inside in between the teeth 410 and touch the barrel 310, and to prevent this, eight rows may be applied to make the space between the heats narrower, and the number of heats can be adjusted depending on circumstances.

Additionally, the comb structure 450 includes more than one hook 430, which may be formed in the near area of the handle device in both sides of the comb structure 450, and by being hooked to the rotating member, this hook 430 may be fixed into the rotating member and disposed at the barrel 310.

Moreover, when the comb structure 450 is disposed at the barrel 310, the comb tooth protection cover 420 may be formed at the free end of the barrel 310 of both sides, and this comb tooth protection cover 420 may prevent damaging the comb tooth by touching the ground before the comb tooth of the comb structure 450 does when the hair device with the comb structure 450 and comb structure 450 is dropped to ground. In order to implement this protective function, the comb tooth protection cover 430 is a discus shape including the hollow center that fits into the barrel 310, and when looked from the central direction of the barrel 310, the discus-shaped comb tooth protection cover 420 covers the heat of the comb 410, resulting the diameter of the comb tooth protection cover 420 to be larger than the diameter of a virtual circle formed by connecting the comb tooth free ends.

In some embodiments, the hair styling device may include both burn prevention cover 320 and comb structure 450. In other words, after setting up the burn prevention cover 320 to the thermal safe tip 330 of the barrel 310, the comb structure 450 may be fit into the barrel 310. For this, it is necessary to either make the diameter of the passage area of the comb structure 450 larger than the diameter of the burn prevention cover 320, or make the length of the comb structure 450 and/or burn prevention cover 320 less to prevent the burn prevention cover 320 from overlapping with the comb structure 450, and by extending the length of the barrel 310, the burn prevention cover 320 and comb structure 450 may not overlap.

The above explanation is regarding the hair styling device based on this invention, and the following explanation is about the hair styling method based on this invention.

By referring to FIG. 12 or 17, the hair styling method based on this invention is explained below.

Figure 17:
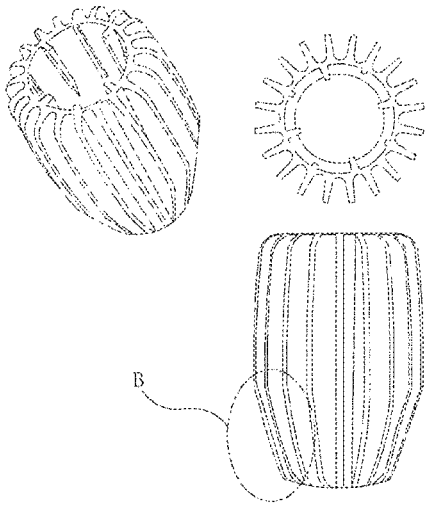
Figure 18:
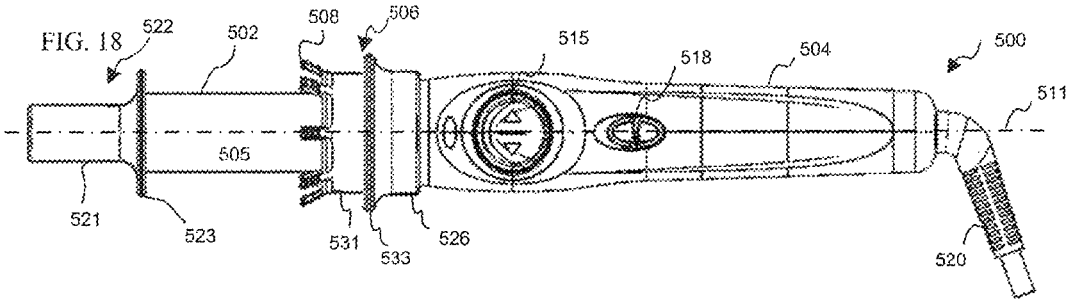
FIG. 18 is a side view of yet another example hair curling device having a rotating member to curl hair around a heated barrel.
Figure 19:
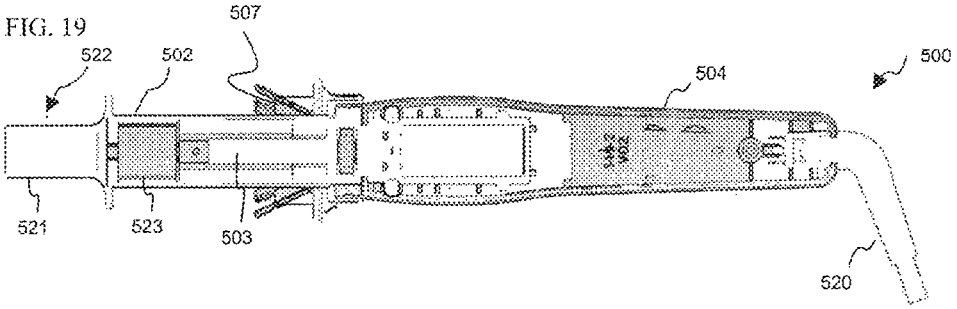
FIG. 19 is a cross-sectional side view of the hair curling device of FIG. 18.
Figure 20:
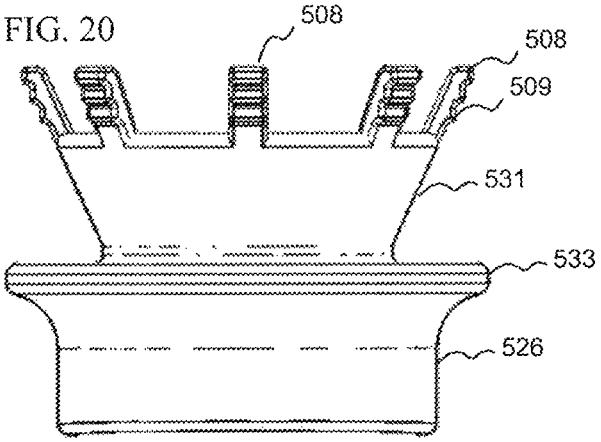
FIG. 20 is a side view of the rotating member of FIG. 18 illustrating hair retaining elements.
Figure 21:
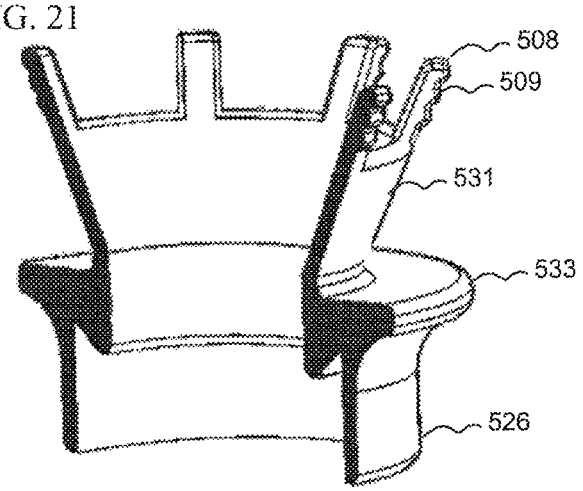
FIG. 21 is a cross-sectional perspective view of the rotating member of FIG. 18.

As in FIG. 12 or 17, the hair styling method based on this invention may include, locating the burn prevention cover near the user's head, maintaining the user's head inside the rotating member of the hair styling device, using the fixed tab for pressing the hair wrapped against the hair styling surface, pushing the user's hair to the hair styling surface using the guide pin, and wrapping the hair maintained around the hair styling surface.

After setting up the burn prevention cover 320 in the heat free tip 330 of the free end of the hair styling surface of the hair styling device, the burn prevention cover 320 is positioned in proximity to the user's head. The burn prevention cover 320 prevents the user's skin from contacting the hair styling surface and disperses the heat of the hair styling surface.

For the step of retaining hair attached to the user's head within a rotating member of the hair styling device, by pressing the rotational switch 370, the rotating member rotates around the hair styling surface, the user's hair is gathered accordingly, and the hair around the hair styling surface is wrapped at the end of the hair styling surface opposite from the free end inside the rotating member of the hair styling device.

A tab 360 fixedly extending from a first end of the rotating member along a longitudinal length of the hair styling surface over less than an entire longitudinal length of the hair styling surface captures wound hair without clamping onto the wound hair.

For the steps of pushing the user's hair toward the barrel and preventing the hair from entanglement when the hair is wound on the barrel, a guide pin 350 extends from a first end of the rotating member along a length direction of the barrel.

For the step of wrapping the retained hair around the hair styling surface to impart a curl in the hair, the rotating member is rotated around the stationary hair styling surface to wind the hair around the hair styling surface. Hair styling may be completed by pulling the hair curling device vertically downward.

Meanwhile, when using the comb structure 450 before a step locating the burn prevention cover 320 near the user's head, or when not using the burn prevention cover 320 before locating the free end of the hair styling surface near the user's head, a step setting up the round brush-shaped comb structure 450 on the hair styling surface may be additionally included.

In such way, after installing the comb structure 450 and locating the comb structure 450 near the user's head, as the rotational switch 370 operates and the rotating member rotates, the comb structure 450 combined with the rotating member rotates, and accordingly, the user may implement the step giving volumes and curls to his or her hair. In some cases, even without rotating the rotating member, the comb structure 450 may comb the hair or make curls.

FIGS. 18-21 illustrate the hair curling device 500 according to yet another embodiment of the present disclosure. Unless otherwise explicitly noted or described, the hair curling device illustrated in FIGS. 18-21 can include similar or same components as those of the hair curling device 100 or 200. The hair curling device 500 may include a heated barrel 502 coupled to a housing (e.g., handle) 504. The heated barrel 502 may define a hair styling surface 505 and a central axis 511. In some embodiments, the hair styling surface 505 may not rotate relative to (e.g., is rotatably coupled to) the handle 504. In other embodiments, the hair styling surface 505 may rotate relative to (e.g., is rotatably coupled to) the handle 504. In some embodiments, a heat selection switch 518 can be arranged along the handle 504, which is configured to permit the user to select among one of several different heat settings, such as a high temperature setting and a low temperature setting.

The hair curling device 500 may also include a rotating member 506 disposed at an end of the hair styling surface 505 and configured to rotate around the central axis 511 of the heated barrel 502. The rotating member 506 may include one or more retaining elements 508 configured to retain the hair and wind the hair around the hair styling surface 505. In some embodiments, the rotating member 506 may have a frustoconical shape including a hollow portion 507 to capture wound hair.

The retaining element 508 may project away from the hair styling surface 505. In some embodiments, the hair curling device 500 includes more than one of the retaining elements 508. The rotating member 506 may define a peripheral region, and a plurality of the retaining elements 508 are spaced apart at the peripheral region. In some embodiments, the retaining elements 508 each includes a ridge 509 or a plurality of ridges. In other embodiments, the retaining element 508 may include various types of features, such as hooks, knobs, pins, and bristles, capable to catch or gather one or more hairs. In some embodiments, the retaining elements 508 extend along less than an entire longitudinal length of the hair styling surface 505. In some embodiments, the retaining element 508 can be arranged at between 0-179 degrees (e.g., about 10 degrees to about 90 degrees or about 20 degrees to about 50 degrees) from the central axis 511 of the barrel 502. In some embodiments, the retaining element 508 can be arranged at 30 degrees from the central axis 511 of the barrel 502.

In some embodiments, the hair curling device 500 may further include a thermal safety tip 522 detachably mounted on a free end of the heated barrel 502. The thermal safety tip 522 may include a reduced diameter portion 521 and a flange 523 disposed between the reduced diameter portion 521 of the thermal safety tip 522 and the hair styling surface 505 when the thermal safety tip 522 is mounted on the free end of the heated barrel 502. In some embodiments, the flange 523 of the thermal safety tip 522 may have a disc shape. In other embodiments, the flange 523 of the thermal safety tip 522 may have any other shape desired. In some embodiments, the reduced diameter portion 521 of the thermal safety tip 522 can include holes (not shown) to disperse heat from the barrel 502 to the outside more quickly. In some embodiments, the thermal safety tip 522 can be made of wood or plastic that has low thermal conductivity, effectively blocking the barrel 502's heat from being delivered to the user. In a further embodiment, any material known in the art with similar characteristics can be used to produce the thermal safety tip 522.

In some embodiments, the rotating member 506 may also include a cylindrical reduced diameter portion 531 supporting the retaining element 508, and a flange 533 coupled to the reduced diameter portion 531 of the rotating member 506 opposite the retaining element 508. In some embodiments, the reduced diameter portion 531 can include a tapered portion that increases in width (e.g., diameter) as it leads into the retaining element 508. Such a tapered portion can help gradually push the hair outward radially so that it can more easily be retained by the retaining element 508. The structure of the rotating member as described herein can allow the users' hair to fall and lie along the rotating member 506 and, in particular, in between the retaining elements 508 without any holding tabs.

In some embodiments, the flange 533 of the rotating member 506 may have a disc shape. In other embodiments, the flange 533 of the rotating member 506 may have any other shape desired. The flanges 523, 533 can help reduce the likelihood of burning the user with the heated barrel 502, by creating a physical barrier between the barrel 502 and the user's head. The rotating member 506 may also have a generally cylindrical hair loading region 526 along which hair that is about to be retained by the retaining elements 508 and wound around the barrel 502 can lie. In some embodiments, the hair loading region 526 can include a tapered portion that increases in width (e.g., diameter) as it leads into the flange 533.

In some embodiments, the hair curling device 500 may also include a heater 503 inside the barrel to heat the barrel 502. The heater 503 may be configured to heat at least a portion of the barrel 502, such as the hair styling surface 505, to curl the user's hair. The heater 503 may be selected from the group consisting of a positive temperature coefficient heater having a function of preventing overheating, an alumina ceramics heater, and heat wave coils.

In some embodiments, the hair curling device 500 may include a motor (not shown) configured to rotate the rotating member 506 in opposite rotational directions. The rotating member 506 may be rotated around the hair styling surface 505 in response to a directional input from the user. In some embodiments, a directional switch (e.g., a toggle switch) 515 can be arranged along the handle 504 to cause the motor to rotate in different (e.g., opposite) directions. For example, the switch 515 can be a rocker switch, such as a three position rocker switch, that can change the direction of the rotation from left (e.g., counterclockwise), stop, and right (e.g., clockwise). The motor can be an electric motor (e.g., an AC or a DC electric motor). Electricity can be provided to the motor using a rotatable power cord (e.g., a swivel power cord) 520.

A hair styling method based on the hair styling device 500 may include, positioning the hair styling device 500 in proximity to a user's head, retaining hair attached to the user's head within the rotating member 506 of the hair styling device 500, and wrapping the retained hair around the hair styling surface 505 to impart a curl in the hair by rotating the rotating member 506 around the hair styling surface 505 to wind the hair around the hair styling surface 505.

The hair styling device 500 as described generally herein can assist the user to gather and wrap the hair by the rotating member to form curls such that it can be used not only for users with long hair but also for users with short hair (e.g., shorter than 6 inches). Depending on the usage requirements or preferences for the particular hair styling device, the rotating member 506 can assist in capturing the hair that might otherwise escape. For example, the rotating member 506 can assist in capturing the hair by trapping the hair lying in the hollow portion 507 between the reduced diameter portion 531 and the heated barrel 502. In certain non-limiting embodiments, the space between the reduced diameter portion 531 and the heated barrel 502 can be narrow (e.g., about 0.01 inches to 0.2 inches) to facilitate capturing short hair therein. In further embodiments, the reduced diameter portion 531 can include a tapered portion that decreases in width (e.g., diameter) as it leads into the flange 533 for capturing the hair in the space between the heated barrel 502 and an end of the reduced diameter portion 531 proximal the flange 533.

While the systems and methods described herein have been particularly shown and described above with reference to exemplary embodiments thereof, it will be understood, that various changes in form and detail can be made without departing from die spirit and scope of the systems and methods described and defined by this disclosure. Therefore, other embodiments are within the scope of this disclosure and the following claims.

The invention is claimed as follows:

1. A hair styling apparatus comprising:

a heated barrel defining a hair styling surface and a central axis; and a rotating member disposed at an end of the hair styling surface and configured to rotate [with respect to the heated barrel] about the central axis of the heated barrel, the rotating member comprising a retaining tab that is configured to retain the hair and wind the hair around the hair styling surface, the retaining tab extending along a same direction as the central axis of the heated barrel, wherein, in an at-rest position, the retaining tab is spaced apart from an entire length of the heated barrel without being held in place by a user, wherein the rotating member forms an outer surface of the hair styling apparatus, wherein the outer surface of the hair styling apparatus comprises a lower portion comprising a handle of the hair styling apparatus and an upper portion comprising the heated barrel, wherein the rotating member is hollow and comprises an upper end and a lower end, and the handle extends beyond a bottom edge of the rotating member at the lower end and the heated barrel extends beyond a top edge of the rotating member at the upper end, and wherein the hair styling surface rotates with respect to the handle and about the central axis of the heated barrel.

2. The hair styling apparatus of claim 1, further comprising a thermal safety tip detachably mounted on a free end of the heated barrel.

3. The hair styling apparatus of claim 2, wherein the thermal safety tip comprises a reduced diameter portion and a flange disposed between the reduced diameter portion of the thermal safety tip and the hair styling surface when the thermal safety tip is mounted on the free end of the heated barrel.

[4. The hair styling apparatus of claim 1, wherein the rotating member further comprises a reduced diameter portion supporting one or more retaining elements, and a flange coupled to the reduced diameter portion of the rotating member opposite the one or more retaining elements.]

[5. The hair styling apparatus of claim 4, wherein the flange has a disc shape.]

6. The hair styling apparatus of claim 1, wherein the rotating member has a frustoconical shape including a hollow portion to capture wound hair.

7. The hair styling apparatus of claim 1, further comprising one or more retaining elements, wherein the one or more retaining elements comprise ridges.

8. The hair styling apparatus of claim 1, further comprising a plurality of retaining elements.

9. The hair styling apparatus of claim 8, wherein the rotating member defines a peripheral region, and the plurality of retaining elements are spaced apart at the peripheral region.

10. The hair styling apparatus of claim 1, further comprising one or more retaining elements, wherein the one or more retaining elements extend along less than an entire longitudinal length of the hair styling surface.

11. The hair styling apparatus of claim 1, further comprising a heater inside the barrel to heat the barrel.

12. The hair styling apparatus of claim 11, wherein the heater is selected from the group consisting of a positive temperature coefficient heater having a function of preventing overheating, an alumina ceramics heater, and heat wave coils.

13. The hair styling apparatus of claim 1, further comprising a motor configured to rotate the rotating member in opposite rotational directions, wherein the rotating member is rotated around the hair styling surface in response to a directional input from the user.

14. The hair styling apparatus of claim 1, wherein the rotating member further comprises an upper surface through which the heated barrel extends, and the retaining tab extends from the upper surface of the rotating member.

15. The hair styling apparatus of claim 1, further comprising another retaining tab and a plurality of retaining elements, wherein the upper end of the rotating member comprises an upper surface, wherein the retaining tab and the another retaining tab extend from the upper surface of the rotating member, wherein the plurality of retaining elements are distributed evenly around the rotating member, and wherein the lower end of the rotating member comprises a hair loading region comprising a tapered portion that increases in width as it leads into the plurality of retaining elements.

16. A method of using a hair styling device, comprising:

positioning the hair styling device in proximity to a user's head, the hair styling device comprising:

a heated barrel defining a hair styling surface and a central axis; and a rotating member disposed at an end of the hair styling surface and configured to rotate [with respect to the heated barrel] about the central axis of the heated barrel, the rotating member comprising a retaining tab that is configured to retain the hair and wind the hair around the hair styling surface, the retaining tab extending along a direction of the central axis of the heated barrel, wherein, in an at-rest position, the retaining tab is spaced apart from an entire length of the heated barrel without being held in place by a user, wherein the rotating member forms an outer surface of the hair styling device, wherein the outer surface of the hair styling apparatus comprises a lower portion comprising a handle of the hair styling apparatus and an upper portion comprising the heated barrel, wherein the rotating member is hollow and comprises an upper end and a lower end, and the handle extends beyond a bottom edge of the rotating member at the lower end and the heated barrel extends beyond a top edge of the rotating member at the upper end, and wherein the hair styling surface rotates with respect to the handle and about the central axis of the heated barrel;

retaining hair attached to the user's head within the rotating member of the hair styling device; and wrapping the retained hair around the hair styling surface to impart a curl in the hair by rotating the rotating member around the hair styling surface to wind the hair around the hair styling surface.

17. The method of claim 16, wherein a thermal safety tip is mounted on a free end of the hair styling surface.

18. The method of claim 16, wherein the hair styling device further comprises one or more retaining elements, and the one or more retaining elements extend along less than an entire longitudinal length of the hair styling surface.

19. The method of claim 16, wherein the hair styling device further comprises a motor configured to rotate the rotating member in opposite rotational directions, and wherein the rotating member is rotated around the hair styling surface in response to a directional input from the user.

20. The method of claim 16, wherein the hair styling device further comprises a plurality of retaining elements.

21. The method of claim 20, wherein the rotating member defines a peripheral region, and the plurality of retaining elements are spaced apart at the peripheral region.

* * * * *